United States Patent [19]
Bayer et al.

[11] 3,829,580
[45] Aug. 13, 1974

[54] FUNGICIDAL DITHIOMALONAMIDES AND THEIR CONGENERS
[75] Inventors: Horst O. Bayer, Levittown; Ernest D. Weiler, Washington, both of Pa.
[73] Assignee: Rohm and Haas Company, Philadelphia, Pa.
[22] Filed: Apr. 24, 1972
[21] Appl. No.: 247,070

[52] U.S. Cl. ............. 424/320, 260/551 R, 424/289, 424/294, 424/295
[51] Int. Cl. ............................................. A01n 9/20
[58] Field of Search .................................... 424/320

[56] References Cited
UNITED STATES PATENTS
3,262,843   7/1966   Peacock ............................ 424/320
3,422,202   1/1969   Olin .................................. 424/328

OTHER PUBLICATIONS
Chemical Abstracts, Vol. 69(1968), p. 105943n.
Chemical Abstracts, Vol. 58 (1963), p. 7863f.
Chemical Abstracts, Vol. 69 (1968), p. 105943 n.

*Primary Examiner*—Vincent D. Turner

[57] ABSTRACT

This invention relates to novel compositions of matter which are selected metal salts, quaternary ammonium metal chelates, and polychelates of dithiomalonamide, its N-alkyl and N-Aryl derivatives, its phenylhydrazono derivatives, and its higher alkylene homologs. These permit significant control of fungal infections of the Genus Botrytis and against grape downy mildew.

3 Claims, No Drawings

FUNGICIDAL DITHIOMALONAMIDES AND THEIR CONGENERS

This invention relates to novel compositions of matter, having selected fungicidal properties. The active principle of these compositions conform to the general planar structural formula:

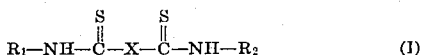

wherein when X is $(CHR_3)_n$, $R_1$ and $R_2$ are independently selected from one of hydrogen, alkyl of one to 10 carbon atoms straight or branched; aryl from six to 10 carbon atoms, preferably phenyl; monosubstituted aryl from seven to twelve carbons including halogen, preferably chloro; lower alkyl to four carbons; nitro and methoxy; but not more than one of $R_1$ and $R_2$ being an aryl or substituted aryl; $R_3$ is one of hydrogen, alkyl straight or branched from one to ten carbon atoms; and $n$ is a whole positive integer from one to three; or

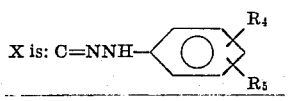

wherein $R_4$ and $R_5$ are one of hydrogen; alkyl to four carbons; alkoxy to four carbons; acetyl; halogen, preferably chloro; hydroxy; phenyl; dialkylamine to four carbons, their metal salts, quaternary ammonium metal chelates, and polychelates thereof. Most preferred are compounds wherein $R_1$ is unsubstituted phenyl or hydrogen, $R_2$ is hydrogen, and X is the phenyl hydrazono moiety.

Among the herein disclosed genus of fungicidally active compositions are a subgenus of novel and unobvious compounds having the planar structural formula:

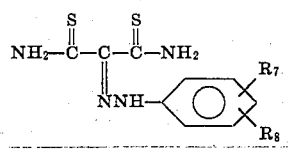

wherein $R_7$ and $R_8$ are independently selected from one of hydrogen, alkyl straight or branched from one to four carbon atoms, acetyl, dialkylamino to four carbons, halo, preferably chloro; hydroxy and phenyl.

The novel compounds disclosed herein have exhibited outstanding biocidal properties, and have proven to be especially effective against a wide variety of fungi that are known as harmful to many crops. As is necessary for an acceptable agricultural biocide, the compounds of the present invention have not exhibited any substantial phytotoxic effect on the agricultural plants while demonstrating exceptional control of noxious microorganisms. Because of their outstanding success in this respect, the compounds and processes of this invention represent an important step forward in the science of agricultural pesticides.

Although dithiomalonamide and numerous of its derivatives disclosed herein, such as N-Phenyl and N-Alkyl dithiomalonamides, also N-Phenyl-2-phenylhydrazonodithiomalonamides, are extensively reported in the literature, no suggestions of biocidal properties were turned up for them.

Among somewhat structurally related compounds reported as having fungicidal properties are certain phenylhydrazono-cyanothioacetamides (U.S. Pat. No. 3,179,651). Also, dithiooxamides, and polychelates thereof, are known compounds, while aryl substituted dithiooxamides are patented as herbicides, insecticides and fungicides (U.S. Pat. Nos. 3,318,675 and 3,422,202). Still there is no known prior art leading one to prepare and evaluate the presently claimed dithiomalonamides as selective fungicides.

According to the present invention, the active compounds of this disclosure are generally and readily prepared by treatment of an appropriately substituted malononitrile with hydrogen sulfide under a variety of reaction conditions, following well-established literature methods. Typically the starting nitrile, which is readily prepared by standard procedures, be it malononitrile, succinonitrile, or glutaronitrile, is converted by literature method into the corresponding dithioamides.

Similarly, mono- and disubstituted malononitriles, for example, by treatment with either thioacetamide or hydrogen sulfide give the correspondingly substituted dithioamide analogs.

Despite the number of commercially successful fungicides, such as mancozeb, available to agriculture, the quest has continued for better fungicidal agents which are effective with minimal phytotoxicity, and which remain effective over increased periods of time in order to minimize labor-consuming retreatment of growing crops.

However, many candidate fungicides which show considerable promise in greenhouse evaluations, are unable to stand up in more critical field testing, typically because of their lack of persistency in the face of extreme weather conditions such as heavy natural rainfalls.

The novel products of this invention include dithiomalonamide, its higher alkylene homologs, selected metal salts, quaternary ammonium metal chelates and polychelates thereof, which find utility as persistent fungicides against certain economically important fungal infections such as Botrytis and grape downy mildew.

Examples of compounds useful within the present invention are tabulated below:
Dithiomalonamide
Dithiosuccinamide
Dithioglutaramide
N-Methyl-Dithiomalonamide
N,N'-Dimethyl-Dithiomalonamide
N-Ethyl-Dithiomalonamide
N,N'-Diethyl-Dithiomalonamide
N-Propyl-Dithiomalonamide
N,N'-Dipropyl-Dithiomalonamide
N-Methyl-Dithiosuccinamide
N,N'-Dimethyl-Dithiosuccinamide
N-Ethyl-Dithiosuccinamide
N-Methyl-Dithioglutaramide
N,N'-Dimethyl-Dithioglutaramide
N-Ethyl-Dithioglutaramide
2-Methyl-Dithiomalonamide
2-Ethyl-Dithiomalonamide
2-n-Propyl-Dithiomalonamide
2-Isopropyl-Dithiomalonamide
2-n-Butyl-Dithiomalonamide 2-n-Amyl-Dithiomalonamide
2-Isoamyl-Dithiomalonamide
2-n-Hexyl-Dithiomalonamide
2-n-Heptyl-Dithiomalonamide
2-n-Octyl-Dithiomalonamide
2-n-Decyl-Dithiomalonamide
2-Phenethyl-Dithiomalonamide
2-Phenpropyl-Dithiomalonamide
2-Phenbutyl-Dithiomalonamide
2-Phenyl hydrazono-Dithiomalonamide
4-Methoxyphenylhydrazono-Dithiomalonamide
3,4-Dichloro-phenylhydrazono-Dithiomalonamide
4-Chlorophenylhydrazono-Dithiomalonamide
4-N,N-Dimethylaminophenylhydrazono-Dithiomalonamide
4-Carboxymethylphenylhydrazono-Dithiomalonamide
4-n-Butylphenylhydrazono-Dithiomalonamide
4-Hydroxyphenylhydrazono-Dithiomalonamide
3,5-Dichlorophenylhydrazono-Dithiomalonamide
2-Methylphenylhydrazono-Dithiomalonamide
4-Nitrophenylhydrazono-Dithiomalonamide
4-Chlorophenylhydrazono-Dithiomalonamide
4-Ethoxyphenylhydrazono-Dithiomalonamide
4-Propoxyphenylhydrazono-Dithiomalonamide
N-Phenyl-2-Phenylhydrazono-Dithiomalonamide
N-4-Chlorophenyl-2-Phenylhydrazono-Dithiomalonamide
N-4-Chlorophenyl-2-3,4-Dichlorophenylhydrazono-Dithiomalonamide
N-4-N,N-Dimethylaminophenyl-2-Phenylhydrazono-Dithiomalonamide
N-Phenyl-2-4-N,N-Dimethylaminophenyl-Dithiomalonamide
N-Phenyl-2-4-n-Butylphenyl-Dithiomalonamide
N-4-n-Butylphenyl-2-Phenylhydrazono-Dithiomalonamide
N-Phenyl-Dithiomalonamide
N-4-Chlorophenyl-Dithiomalonamide
N-3,4-Dichlorophenyl-Dithiomalonamide
N-4-N,N-Dimethylaminophenyl-Dithiomalonamide
2-Phenyl-Dithiomalonamide The arylhydrazone derivatives of the here-disclosed dithioamides are generally prepared starting with malononitrile, for example, and treating with the variously prepared phenyl diazonium salts to give the intermediate phenylhydrazono-malonitriles. These nitrile derivatives are readily converted into novel and fungicidally active phenylhydrazonodithioamides of this invention.

The dithioamides of this invention wherein at least one of $R_1$ and $R_2$ are other than hydrogen, are prepared as follows: An N-Aryl- or N-Alkyl-cyanothioacetamide in an appropriate solvent such as N,N-dimethylformamide, conveniently using anhydrous HCl as acidifying medium, is admixed with thioacetamide under heating to produce the corresponding amide, such as N-methyl-dithiomalonamide.

The above base compounds are conveniently formed into metal salts and quaternary ammonium metal chelates and polychelates (Formulas II, III, and IV), conforming to the general structural formula, respectively:

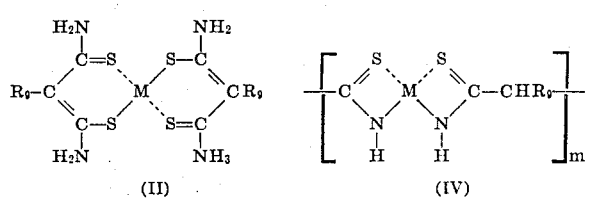

(II)  (IV)

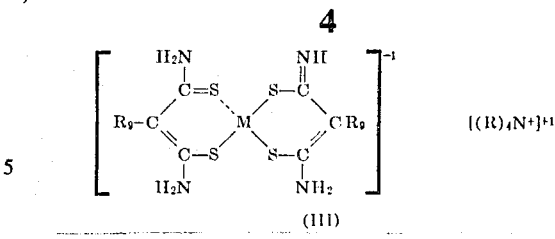

(III)

wherein M is a metal ion selected from one of copper and zinc, m is a whole positive integer greater than one, and $R_9$ is an alkyl moiety straight or branched from one to eight carbon atoms or phenyl.

These compounds are fungicidal to such phytopathogens as the common gray mold, *Botrytis cinerea*; powdery mildew such as *Erysiphe polygoni*; rice blast, *Piriculari oryzae*; late blight such as *Phytophthora infestans*; downy mildew such as *Pseudoperonospora*; and *Cercospora blight*, such as *Cercospora apii*. In control of these diseases, the compounds are considered most useful for the control of *Botrytis cinerea*.

The compounds of this invention are not all novel structures, as indicated earlier. Compounds of Formula I where $CHR_3$ is other than phenylhydrazone and $R_1$ and $R_2$ are hydrogen, are known and preparable by the literature methods previously outlined. The actual preparation of plural compounds of this invention will be set forth subsequently herein.

The following preparations were evaluated in this connection with this for the control of *Botrytis blight*, as follows:

TABLE 1

| | |
|---|---|
| A | Dithiomalonamide |
| B | Dithiosuccinamide |
| C | 2-n-Butyl-Dithiomalonamide |
| D | 2-n-Octyl-Dithiomalonamide |
| E | Phenylhydrazono-Dithiomalonamide |
| F | 4-Methoxyphenylhydrazono-Dithiomalonamide |
| G | 4-Chlorophenylhydrazono-Dithiomalonamide |
| H | 4-N,N-Dimethylaminophenylhydrazono-Dithiomalonamide |
| I | 4-Carboxymethylphenylhydrazono-Dithiomalonamide |
| J | 4-n-Butylphenylhydrazono-Dithiomalonamide |
| K | 2-Methylphenylhydrazono-Dithiomalonamide |
| L | Oxalic Acid Salt of 4-N,N-Dimethylaminohydrazone Dithiomalonamide |
| M | N,N'-Dimethyl dithiomalonamide |
| N | N,N'-di-n-Butyl dithiomalonamide |
| O | N-Phenyl-Dithiomalonamide |
| P | N-Phenyl-2-Phenylhydrazono-Dithiomalonamide |
| Q | N-Phenyl-2[4-Methoxyphenylhydrazono]-Dithiomalonamide |
| R | N-Phenyl-2[4-Carbomethoxyphenylhydrazono]-Dithiomalonamide |
| S | N-Phenyl-2[4-N,N-Dimethylaminophenylhydrazono]-Dithiomalonamide |
| T | Copper Polychelate of Dithiomalonamide |
| U | Nickel Salt of Dithiomalonamide |
| V | Zinc Polychelate of Dithiomalonamide |
| W | Tetrapropylammonium Zinc Dithiomalonamide Chelate |
| X | Tetrapropylammonium Copper Dithiomalonamide Chelate |
| Y | Copper Polychelate of Dithiooxamide |
| Z | Nickel Polychelate of Dithiooxamide |
| ZA | Zinc Polychelate of Dithiooxamide |

Ten day old English broad bean plants, *Vicia faba*, having a height of about 5 inches were sprayed to run off with the test compound, dissolved in a 50:50 mixture of acetone and methanol, then diluted with water to give 1,200 ppm, i.e., 1 lb. per 100 gallons. The plants were air dried then inoculated with a spore suspension containing about 150,000 spores of *Botrytis cinerea*. The plants were then placed in a humidity cabinet at 80°-82°F. for 3 days. The percent of disease control was then estimated in comparison with untreated controls and the commercial fungicide folpet, N-(trichloromethylthio)-phthalimide.

Certain preparations were then compared in a secondary evaluation using the above procedure on *Botrytis*

*cinerea*, but adapted to gauge persistency. A dosage series from 1.0 to 0.25 lbs/acre was employed. Weathering of the sprayed deposit was conducted in a standardized rain machine with 8 minutes of rain which, with the settings used, amounted to 1 inch of rain.

The results under both sets of conditions are set forth in Table IA.

Untreated berry checks are dipped in distilled water. The thusly treated plates are arranged in the plastic boxes in which a liter of water has been previously poured in order to provide a saturated hygrometry.

Artificial contamination of the plates is achieved from a culture of a chosen strain which is sporulated, or from naturally diseased berries. The latter source is

TABLE 1A

Foliar Control of *Botrytis cinerea* on Bean Plants and Downy Mildew on Grapes

| | Degree Control (lbs./acre) | | | | | | | |
|---|---|---|---|---|---|---|---|---|
| | *Botrytis cinerea* | | | | Grape Downy Mildew | | | |
| | Initial | | Persistent | | Initial | | Persistent | |
| Prep.* | 1.0 | 1.0 → | 0.5 | 0.25 | 1.0 | 1.0 → | 0.5 | 0.125 |
| A | A | C | — | — | A | C | — | — |
| B | A | C | C | — | — | C | C | — |
| C | A | B | — | — | A | C | — | — |
| D | A | B | — | — | A | — | — | — |
| E | A | C | — | — | — | — | C | C |
| F | A | C | — | — | — | — | — | — |
| G | A | B | — | — | — | — | — | — |
| H | A | A | A | C+ | — | — | A | A |
| I | A | A | A | C | — | — | A | C |
| J | A | A | B+ | C | — | — | A | C |
| K | A | A | C | — | — | — | A | C |
| L | A | — | B | — | — | — | A | — |
| M | B | — | — | — | A | B | — | C |
| N | B | — | — | — | A | A | A | C |
| O | A | C | — | — | A | A | A | A |
| P | A | B | — | — | A | A | A | A |
| Q | B | C | C | — | — | — | — | — |
| R | A | B+ | B | — | — | — | A | — |
| S | A | C+ | C | — | — | — | C | — |
| T | A | B | — | — | A | C | — | — |
| U | A | A | A | B | A | A | C | C |
| V | A | C | — | — | B | C | — | — |
| W | A | C | — | — | A | C | — | — |
| X | A | C | — | — | A | C | — | — |
| Y | C | C | — | — | A | B | — | — |
| Z | C | C | — | — | B | C | — | — |
| ZA | C | C | — | — | A | C | — | — |

*chemical identity presented in Table I.
A = 98 to 100% Control
B = 90 to 97% Control
C = Below 90% Control

PROCEDURE FOR EVALUATION OF BOTRYTIS CINEREA ON GRAPE BERRIES

A number of plastic boxes of 45 × 15 × 15 cm. are fitted with a plate of foamed polyethylene with a plurality of alveoles of 1 to 1.2 cm. in diameter, generally in regular rows. The plate is spaced from the box bottom between 4 and 5 cm. high. A flexible transparent plastic sheet is disposed with a hermatic seal of the flanged lid of the box.

Each plate is considered as a replicate and is divided by 10 straight lines defining 9 alveoles within each band, thereby permitting evaluation of up to 10 products per box.

PREPARATION OF THE BERRIES

Berries of the same variety, same stage of maturity, and about the same size are employed. An identical wound is made on each berry by extracting the penducles in the same manner for each berry. The wounded berries are disposed, wound upward, in the cupules, which define the upper ends of each alveole. The berries are thus conveniently arranged in linear columns in the plate. For each candidate fungicide, at least 10 berries are prepared and arranged in a box, which is dipped in an aqueous suspension of the candidate fungicide for five seconds. Drainoff of the adhering liquid suspension occurs during the next 10 to 20 seconds.

preferable in order to obtain a homogeneous suspension on spores, and at least 30 berries with the same level of disease.

When the deposits on the berries is completely dry, use of a hand sprayer at low pressure is employed to spray the prepared boxes. The inoculum fog falls slowly by gravity onto the berries.

For observation purposes, the following steps are carried out:

a. Each berry is divided into 6 horizontal zones;

b. The extent of disease is gauged by the extent to which the contamination of the zones more distant from the wound occurs; a visual rating of one to five is given to each berry, with 5 indicating the highest degree of contamination, of that is extending to the zone most remote from the wound.

c. Mathematicl analysis is performed on the recorded numerical ratings to provide statistically significant results.

The aforedescribed method allows study of the curative action of the candidate product before spraying. The results obtained under the aforedescribed and very severe assay conditions provide an excellent indicia of the prospects for candidates in subsequent field testing.

Exemplary compounds of this invention were assayed according to the foregoing invention, and were found to give equal control of *B. cinerea* at (600 ppm A.I.). The data are presented in Table II below:

TABLE II

Control of *Botrytis Cinerea* on Grape Berries

| Compound | PPM | Number of Fruit Healthy | Diseased |
|---|---|---|---|
| A | 600 | 20 | 0 |
| H | 600 | 20 | 0 |
| U | 600 | 20 | 0 |
| folpet | 600 | 20 | 0 |
| Non-treated Control | — | 0 | 20 |

These compounds give excellent control of *Botrytis cinerea* on grapes. They have an advantage over the commercial fungicides now used for *Botrytis* control in that they do not delay the fermentation of grape juice in its conversion to wine. The following type test was devised to determine this.

A standard grape juice mixture was prepared by combining 400 ml. of commercial grape juice, 45 g. of sucrose and 50 million *Saccharomyces cerevisiae* yeast cells. The test chemical was then added at a given concentration in parts per million (ppm) and the flasks were stoppered with an outlet provided, which connected to a 120 ml. bottle filled with water. As fermentation progressed, carbon dioxide was produced and was trapped in the bottle. The time required to collect approximately 120 ml. of carbon dioxide was determined. N-Trichloromethylthiophthalimide (folpet) was used as a standard. Table III presents the results:

TABLE III

| Preparations | Fermentation Data Concentration (ppm) | | |
|---|---|---|---|
| | 20 | 5 | 1 |
| A | 2 days[a] | 2 days | 2 days |
| folpet | >22 do. | 15 do. | 8 do. |
| check | 2 do. | 2 do. | 2 do. |

[a] Number of days required to collect 120 ml. of $CO_2$.

The compounds of this invention were also evaluated on a number of fungi including grape downy mildew, rice *Helminthosporium*, tomato late blight, and *Cercospora*.

For the test on downy mildew, Seibel 1000 grape plants in the 4–5 leaf stage, were used. These were sprayed with a suspension of the compound till droplets formed, and then allowed to dry. The plants were sprayed with a spore suspension of *Plasmopara viticola* containing 100–125,000 spores per ml. The plants were then humidified for 48 hours at 60°F. They were transferred to a growth room for 48 hours and back to the humidity chamber for 24 hours. The readings are estimations of the amount of diseased leaf tissue to the nearest 5 percent.

Tests involving the control of late blight, *Phytophthora infestans*, of tomato were carried out as described below. Succulent 3–4 inch high tomato plants were used. The plants were sprayed with a 1,200 ppm solution of the test compound in a solvent system consisting of acetone:Methanol:water at 25:25:50 by hand spraying to just wet the foliage with a minimum of run-off. The plants were then allowed to dry and placed in a greenhouse for 2–3 days. The plants were then inoculated with a spore suspension of *Phytophthora infestans* containing 20,000 spores per ml. The plants were then placed in a 100 percent humidity chamber at 55°F. for about 36 hours then moved to a 70°F. growing room for 1–2 days. The percent disease that had developed in comparison with untreated controls was then read by means of lesion counts, and the percent disease control estimated by comparison with untreated plants and DITHANE M-45 as a standard.

For the evaluations on *Cercospora* blight, 8 week old celery seedlings were used. The plants were sprayed with the test compound at 1,200 ppm and dried. The plants were then inoculated with a suspension of *Cercospora apii* spores containing approximately 25,000 spores per ml. The plants were then incubated for 24 hours in a humidity cabinet at 80°F. and then held in the greenhouse using a daily misting with water for 14–18 days. Following this, the percent control of the *Cercospora* disease was estimated in comparison with untreated plants and with DITHANE M-45 as a standard.

For the rice *Helminthosporium* test, two week old rice seedlings were sprayed with the compounds under evaluation at 1,200 ppm. The sprayed plants were then allowed to dry. They were then stored in the greenhouse at room temperature for about 24 hours. The plants were then inoculated with a suspension of about 40,000 spores per ml. of *Helminthosporium oryzae*. The spores were incubated by holding the inoculated plants at about 52°F. and 100 percent relative humidity for about 22 hours. The plants were then placed in an illuminated test room and held at about 75°F. for a period of 4 days.

The disease lesions that developed on the plants were then counted after the four day residence period in the illuminated test room. Each compound was then assigned an activity rating based on the lesion count. The activity ratings ranged from "not active" to "very active." A rating of "not active" indicated that the number of disease lesions counted were about the same as the number of disease lesions counted on an untreated plant.

The results of the above fungicidal evaluations are given below in Table IV.

TABLE IV

| Preparation | Percent Control of Various Fungi | | |
|---|---|---|---|
| | Rice *Helminthosporium* | *P. infestans* | *C. apii* |
| E | | A | |
| F | | | B |
| H | | A | |
| T | B+ | | |
| V | B+ | | |
| X | | | B |

Illustrative of the practice of this invention are the following examples, which should be understood, of course, as not limiting.

EXAMPLE I

Preparation of Dithiomalonamide, Prep. A.

A 500 ml. pressure apparatus was charged with 50 g. (.755 mol) of malononitrile, 200 ml. of pyridine, and liquid hydrogen sulfide to a pressure of 100 p.s.i. The reaction apparatus was maintained at 50°C. for 4 hours, cooled, and allowed to stand at room temperature for an additional 12 hours. Long, yellow needles were filtered off, washed with small amounts of methanol to give 47.0 g. of product; which was recrystallized from water, mp 214°–215°C.

The filtrate was reduced in volume and a yellow precipitate was obtained, which was filtered off, washed with hot water, dried, and found to be cyanothioacetamide, mp 117°–119°C.

EXAMPLE II

Preparation of Dithiosuccinamide, Prep. B.

A 500 ml. pressure apparatus was charged with 50 g. (0.625 mil) of succinonitrile, 200 ml. of pyridine, and liquid hydrogen sulfide (100 p.s.i.). The reaction apparatus was maintained at 50°C. for 7 hours, cooled, and allowed to stand at room temperature for 24 hours. A brown solid was filtered off, washed with 200 ml. of an ether-hexane solution (1:1) to give 23.6 g. (25 percent of product; mp. < 260°C.

EXAMPLE III

Preparation of 2-n-Butyl-Dithiomalonamide, Prep. C.

A 25 ml. N,N-dimethylformamide solution, nearly saturated with anhydrous hydrogen chloride, containing 8.0 g. (0.0655 mol) of 2-n-butyl-malononitrile and 9.35 g. (0.1310 mol) of thioacetamide, was heated on a steam bath for 30 min. The hot solution is neutralized with a saturated sodium bicarbonate solution and a red oil precipitated. The latter is extracted into ether, the ether was dried over magnesium sulfate, and evaporated to give a yellow oil. The oil partially crystallized on standing, and the yellow solid is triturated with hexane, filtered and dried to give 2.5 g. (20 percent) of product, mp. 142°–144°C.

EXAMPLE IV

Preparation of 2-n-Octyl-Dithiomalonamide, Prep. D.

Hydrogen sulfide was passed into a 60 ml. anhydrous ethanol solution containing 0.19 g. (0.0028 mol) of potassium ethoxide and 5.0 g. (0.0028 mol) of n-octyl-malononitrile for 4 hours. The solution was allowed to stand overnight, and was again saturated with hydrogen sulfide for 4 hours. This procedure was repeated 4 times. The solution was evaporated to dryness, and the resultant white solid was extracted with ether. The ether solution was dried over magnesium sulfate and evaporated to give a white solid. Repeated recrystallization of this solid gave 0.3 g. (5 percent) of product, mp. 139°–141°C.

EXAMPLE V

General Method of Preparation for Phenylhydrazono-Malononitriles:

To an ice-cold slurry of 33.2 g. (0.2 mol) of 3,5-dichloroaniline and 200 ml. of water was added a solution of 16.0 g. (0.23 mol) of sodium nitrite in 50 ml. of water. The mixture was maintained at 0°C. while adding 440 ml. of dilute hydrochloric acid (180 ml. conc. HCL and 260 ml. water). The diazonium salt solution was then treated with a solution of 13.2 g. (0.2 mol) of malononitrile in 266 ml. of ethanol. Vigorous stirring and cooling continued, followed immediately by neutralization of the solution by addition of aqueous sodium acetate. The yellow solid which separated, was collected and gave 47.1 g. (100.0 percent) of 3,5-Dichlorophenylhydrazono-malononitrile; mp. 185°–190°, recrystallized (benzene) mp. 203°–205°C.

EXAMPLE VI

When the following anilines are substituted for the 3,5-dichloroaniline in the procedure of Example V, the corresponding listed products are obtained:

TABLE V

| STARTING MATERIAL | PRODUCT | MELTING PT. |
|---|---|---|
| 3,4-Dichloroaniline | 3,4-Dichlorophenyl-hydrazono-malononitrile | 186–188°C. |
| 4-Chloroaniline | 4-Chlorophenylhydrazono-malononitrile, Prep. G | 192–194°C. |
| 4-Methoxyaniline | 4-Methoxyphenylhydrazono-malononitrile | 160–162°C. |
| 4-Hydroxyaniline | 4-Hydroxyphenylhydrazono-malononitrile | 194–195°C. |
| 4-Nitroaniline | 4-Nitrophenylhydrazono-malononitrile, Prep. H | 228–230°C. |
| 2-Methylaniline | 2-Methylphenylhydrazono-malononitrile, Prep. K | 91–93°C.(DEC) |
| 4-n-Butylaniline | 4-n-Butylphenylhydrazono-malononitrile, Prep. J. | 86–88°C. |
| 4-N,N-Dimethylamino-aniline | 4-N,N-Dimethylamino-phenylhydrazono-malononitrile, Prep. L | 147–149°C. |
| 2,4-Dimethylaniline | 2,4-Dimethylphenylhydrazono-malononitrile | 96–98°C. |

EXAMPLE VII

General Method of Preparation of Phenylhydrazono-Dithiomalonamides and Phenylhydrazono-Cyanothioacetamide Preparation of 4-Methoxyphenylhydrazono-Dithiomalonamide, Prep. F A solution of 10.0 g. (0.05 mol) of 4-methoxyphenylhydrazono-malononitrile (Ex. VI) in 100 ml. of pyridine triethylamine (9:1) was slowly treated with hydrogen sulfide for 4 hours. The solution was then poured into 500 ml. of icewater, and stirred to room temperature. A yellow-orange precipitate separated, which was collected and gave 4.05 g. (31.0%) of product; mp. 176°–178°C. (ethyl acetate).

Preparation of 4-MethoxyphenylhydrazonoCyanothioacetamide

The filtrate of EX. VII was cooled, and neutralized with concentrated hydrochloric acid. An orange precipitate separated, which was collected and gave 7.9 g. (67.4 percent) of product; mp. 203°–205°C. (ethyl acetate).

The following compounds were prepared by the method outlined above, unless otherwise indicated.

EXAMPLE VIII

Preparation of Phenylhydrazono-Dithiomalonamide, Prep. E.

A 0.051 mol run: treated with excess hydrogen sulfide for 4 hours pouring into ice-water gave 8.3 g. (68.5 percent) of yellow product; mp. 170°–172°C. (ethyl acetate).

EXAMPLE IX

Preparation of 4-Chlorophenylhydrazono-Dithiomalonamide, Prep. G

A 0.049 mol run: treated with excess hydrogen sulfide for 7 hours; pouring into ice-water gave 7.4 g. (58.9 percent) of yellow product; mp. 211°–212°C. (dec.) ethyl acetate).

A 60 ml. N,N-dimethylformamide solution, nearly saturated with anhydrous hydrogen chloride, containing 3.5 g (0.02 mol) of N-phenyl-cyanothioacetamide, and 3.0 g. (0.04 mol) of thioacetamide was heated on a steam bath for 3 hours. Most of the N,N-dimethylformamide was distilled off under reduced pressure. The oil residue was neutralized with a sodium bicarbonate solution, and a dark brown precipitate was obtained.

The latter was extracted into ether, the ether solution was dried over magnesium sulfate, and evaporated to give a dark orange product, 0.7 g. (17 percent); mp. 118°–120°C.

The analytical data for the aforedescribed compounds is set forth in Table VI.

TABLE VI

| Preparation | m.p.°C | Empirical Formula | Analytical Data on Compounds of the Invention (Calculated) | | | | |
|---|---|---|---|---|---|---|---|
| | | | C | H | N | S | Cl |
| A | 212–214 | $C_3H_6N_2S_2$ | 27.14(26.9) | 4.30(4.5) | 21.02(20.9) | 47.45(47.8) | |
| B | > 250 | $C_4H_8N_2S_2$ | 33.13(32.5) | 5.40(5.5) | 19.18(18.9) | 43.29(43.3) | |
| C | 142–144 | $C_{17}H_{14}N_2S_2$ | 44.67(44.2) | 7.28(7.4) | 14.69(14.7) | 33.67(33.8) | |
| D | 139–141 | $C_{11}H_{22}N_2S_2$ | 53.29(53.6) | 9.10(8.9) | 11.21(11.2) | 25.80(26.0) | |
| E | 170–172 | $C_9H_{10}N_4S_2$ | 45.41(45.5) | 4.22(4.2) | 23.26(23.6) | 26.50(26.9) | |
| F | 176–178 | $C_{10}H_{12}N_4OS_2$ | 45.14(45.0) | 4.40(4.5) | 20.83(20.4) | 24.49(23.4) | |
| G | 211–212 | $C_9H_9ClN_4S_2$ | 39.31(39.6) | 3.28(3.3) | 20.29(20.5) | 23.52(23.5) | 12.78(13.0) |
| H | 182–185 | $C_{11}H_{15}N_5S_2$ | 47.43(47.1) | 5.44(5.4) | 24.79(25.0) | 22.42(22.8) | |
| I | 281–282 | $C_{11}H_{12}N_4O_2S_2$ | 44.58(44.5) | 4.26(4.5) | 18.28(19.0) | 17.77(21.5) | |
| J | 156–158 | $C_{13}H_{18}N_4S_2$ | 53.48(53.3) | 6.19(6.2) | 19.04(19.0) | 21.59(21.8) | |
| K | 164–166 | $C_{10}H_{12}N_4S_2$ | 47.66(47.5) | 4.80(4.8) | 22.13(22.3) | 25.27(25.5) | |
| L | > 200 | $C_{11}H_{15}N_5S_2 \cdot C_2H_2O_4$ | 41.26(42.0) | 4.24(4.6) | 18.12(18.8) | 13.90(17.3) | |
| M | 157–159 | $C_5H_{10}N_2S_2$ | 37.28(37.0) | 6.20(6.2) | 17.34(17.3) | 39.52(39.5) | |
| N | 78–80 | $C_{11}H_{22}N_2S_2$ | 53.50(53.7) | 9.16(8.9) | 11.20(11.4) | 26.13(26.0) | |
| O | 118–120 | $C_9H_{10}N_2S_2$ | 51.63(51.4) | 4.96(4.9) | 13.30(13.3) | 30.41(30.5) | |
| P | 157–159 | $C_{15}H_{14}N_4S_2$ | 57.07(57.2) | 4.23(4.4) | 17.46(17.8) | 20.46(20.4) | |
| Q | 172–173 | $C_{16}H_{16}N_4OS_2$ | 56.72(55.7) | 5.02(4.8) | 16.45(16.2) | 17.44(18.6) | |
| R | 178–181 | $C_{17}H_{16}N_4O_2S_2$ | 53.31(54.8) | 4.37(4.3) | 14.82(15.0) | 18.45(17.2) | |
| S | 143–146 | $C_{17}H_{19}N_5S_2$ | 61.14(57.1) | 6.81(5.3) | 19.52(19.6) | 16.64(17.9) | |

EXAMPLE X

Preparation of 4-n-Butylphenylhydrazono-Dithiomalonamide, Prep. J.

A 0.044 mol run: treated with excess hydrogen sulfide for 1 hour, pouring into ice-water gave 5.9 g. (45.5 percent) of yellow solid mp. 156°–158°C.

EXAMPLE XI

2-Methylphenylhydrazono-Dithiomalonamide, Prep. K

A 0.055 mol run: treated with excess hydrogen sulfide for 1 hour; pouring into ice-water gave 3.7 g. (27.6 percent) of yellow solid; mp. 164°–166°C. (ethyl acetate).

EXAMPLE XII

Preparation of N-Phenyl-Dithiomalonamide, Prep. O

To 1142 ml. of 15 percent potassium hydroxide solution at 80°C. was slowly added 100 g. (0.404 mol) of N-phenyl-thiocarbamoyl-ethyl-cyanoacetate, and the mixture was maintained at 80°C. for 90 min. The mixture was then rapidly cooled to room temperature, and cooled further while being acidified with 18 percent hydrochloric acid. Precipitation of a yellow solid was complete after nearly 475 ml. of acid had been added, and addition of another 475 ml. of acid caused extensive foaming. The mixture was filtered after the foaming had subsided, and the yellow solid was dried to give N-phenyl-cyanthioacetamide.

General Method of Preparation for Metal Salts of Dithiomalonamide:

EXAMPLE XIII

Preparation of Copper Polychelate of Dithiomalonamide, Prep. T

A solution consisting of 3.3 g. (0.025 mol) of dithiomalonamide (Ex. I) 2.0 g. (0.05 mol) of sodium hydroxide, and 50 ml. of water was stirred; and treated with 3.4 g. (0.025 mol) of copper chloride in 50 ml. of water. An olive green precipitate formed which was collected to give 4.5 g. of product. Anal. calc'd. for $C_3H_4N_2S_2 \cdot Cu$: C, 16.90(18.41); H, 1.63(2.06); N, 12.31 (14.30); S, 30.29 (32.76); Cu, 30.81 (32.46).

The following salts of dithiomalonamide were prepared by the method outlined above.

EXAMPLE XIV

Preparation of Nickel Salt of Dithiomalonamide, Prep. U 0.025 mol run: Nickel chloride hexahydrate was used; green solid, 3.7 g. was obtained. Anal. calc'd for $C_6H_{10}N_2S_2 \cdot Ni$: C, 19.19 (22.4); H, 3.52(3.10); N, 14.30(17.23); S, 32.59 (39.44); Ni, 14.55 (18.29).

EXAMPLE XV

Preparation of Zinc Polychelate of Dithiomalonamide, Prep. V.

0.025 mol run: Zinc acetate dihydrate was used: yellow solid, 5.7 g. was obtained. Anal. calc'd for $C_3H_4N_2S_2 \cdot Zn$: C, 17.80 (18.24); H, 2.29 (2.04); N, 11.52 (14.17); S, 27.78 (32.46); Zn, 28.85 (33.09).

EXAMPLE XVI

Preparation of Tetrapropylammonium Zinc Dithiomalonamide Chelate, Prep. W

A solution of dithiomalonamide, 3.3 g. (0.025 mol.) and sodium hydroxide, 2.0 g. (0.05 mol.) in 20 ml. of water was stirred, and treated with a solution of tetrapropylammonium bromide, 13.3 g. (0.05 mol) in 50 ml. of water. To this solution was added a solution of zinc acetate, 3.2 g. (0.017 mol) in 50 ml. of water. A light yellow product precipitated 9.2 g. (71.2 percent). Anal. calc'd for $C_3H_{4.5}N_2S_2 \cdot 1/2$ Zn $\cdot 1/2$ $C_{12}H_{28}N$: C, 42.09 (41.81); H, 7.47 (7.21); N, 13.60 (13.54); S, 24.24 (24.80); Zn, 12.48 (12.64).

EXAMPLE XVII

Preparation of Tetrapropylammonium Copper Dithiomalonamide Chelate, Prep. X

This compound was prepared by the method outlined above using copper acetate. The product was a dark green solid, 5.8 g. (45.0 percent). Anal. calc'd. for $C_3H_{4.5}N_2S_2 \cdot 1/2$ Cu $\cdot 1/2 C_{12}H_{28}N$: C, 40.77(41.96); H, 7.02 (7.23); N, 12.47 (13.59); S, 22.59 (24.89); Cu, 14.51 (12.33).

EXAMPLE XIX

General Method of Preparation for Metal Salts of Prior Art Dithiooxamide
Preparation of Copper Polychelate of Dithiooxamide, Prep. Y A solution of 2.4 g. (0.02 mol) of dithiooxamide and 1.6 g. (0.04 mol) of sodium hydroxide in 30 ml. of water was stirred, and treated with a solution of 4.0 g. (0.02 mol) of copper acetate in 50 ml. of water. A black solid precipitate which was collected to give 4.6 g. of product. Anal. calc'd for $C_2H_2N_2S_2 \cdot$ Cu: C, 12.82 (13.22); H, 1.22 (1.11); N, 11.31 (15.41); S, 32.70 (35.29); Cu, 35.57 (34.97).

EXAMPLE XX

Preparation of Nickel Polychelate of Dithiooxamide, Prep. Z 0.02 mol run: Black solid, 3.9 g. Anal. calc'd. for $C_2H_2N_2S_2 \cdot Ni$: C, 12.51(13.58); H, 1.43 (1.14); N, 12.02(15.83); S, 32.69 (36.25); Ni, 29.45 (33.19).

EXAMPLE XXI

Preparation of Zinc Polychelate of Dithiooxamide, Prep. ZA 0.02 mol run: light brown, 3.3 g. Anal. calc'd. for $C_2H_2N_2S_2 \cdot$ Zn. C, 13.62 (13.09); H, 1.08 (1.10); N, 13.69 (15.26); S, 32.88 (35.94); Zn, 35.13 (35.62).

We claim:

1. A method for controlling fungal infections of the Genus Botrytis and grape downy mildew on foliage and fruit comprising applying to a locus to be protected a fungicidally effective but non-phytotoxic amount of 0.25 to 1 pound per acre of a compound of the structural formula:

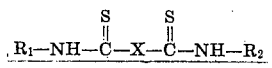

wherein when X is $(CHR_3)_n$, then $R_1$ and $R_2$ are independently selected from one of hydrogen, alkyl of one to ten carbon atoms, aryl from six to 10 carbons, or monosubstituted aryl from seven to 12 carbons, but not more than one of $R_1$ and $R_2$ being an aryl group; $R_3$ is one of hydrogen, alkyl straight or branched from one to 10 carbon atoms; and $n$ is a whole positive integer from one to three; or X is

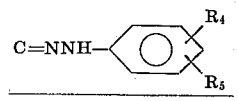

wherein $R_4$ and $R_5$ are one of
 a. hydrogen
 b. alkyl groups selected from methyl, or butyl,
 c. alkoxy groups selected from methoxy, ethoxy or propoxy,
 d. acetyl,
 e. halogen,
 f. hydroxy,
 g. phenyl, or
 h. dimethylamino.

2. The method of claim 1 wherein said compound has the formula:

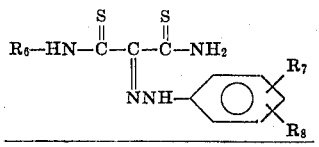

wherein $R_7$ and $R_8$ are one of
 a. hydrogen,
 b. alkyl straight or branched from one to four carbons,
 c. acetyl,
 d. dimethylamino,
 e. halo,
 f. hydroxy or
 g. phenyl, and
 $R_6$ is unsubstituted phenyl or hydrogen.

3. The method according to claim 1 wherein said compound is dithiomalonamide.

* * * * *